US005153989A

United States Patent [19]

Kondo et al.

[11] Patent Number: 5,153,989

[45] Date of Patent: Oct. 13, 1992

[54] PROCESS OF PRODUCING ELECTRICAL TERMINAL WITH ELECTRICAL CONTACTS AND SYSTEM THEREOF

[75] Inventors: Toshio Kondo; Sei Numao, both of Imaichi, Japan

[73] Assignees: The Furukawa Electric Co., Ltd., Tokyo; Hirose Cherry Precision Co., Ltd., Kanagawa, both of Japan

[21] Appl. No.: 792,476

[22] Filed: Nov. 15, 1991

[30] Foreign Application Priority Data

Nov. 16, 1990 [JP] Japan ................................ 2-311133

[51] Int. Cl.$^5$ ........................ H01R 43/20; B23P 23/00

[52] U.S. Cl. ...................................... 29/876; 29/566.1

[58] Field of Search ................. 29/876, 882, 825, 566, 29/566.1

[56] References Cited

U.S. PATENT DOCUMENTS 3,926,357 12/1975 Matrisian .......................... 29/876 X

FOREIGN PATENT DOCUMENTS 3308678 9/1984 Fed. Rep. of Germany ........ 29/825

*Primary Examiner*—Carl J. Arbes

*Attorney, Agent, or Firm*—Armstrong, Nikaido, Marmelstein, Kubovcik & Murray

[57] ABSTRACT

A process of producing electrical terminals with electrical contacts, including the steps of: a first step for continuously providing contact mounting holes at a first predetermined distance in an electrical conductive base and conveying the electrical conductive base in a first direction; a second step for continuously providing contact holding holes at a second predetermined distance in a carrier, continuously fitting electrical contacts into the contact holding holes and conveying the carrier in a second direction perpendicular to the first direction; a third step for positioning the electrical contacts in the contact holding holes of the carrier to the contact mounting holes of the electrical conductive base; a fourth step for fitting the electrical contacts in the contact holding holes into the contact mounting holes of the electrical conductive base; and a fifth step for cutting the electrical conductive base to separate electrical terminal each having an electrical contact at an end thereof.

8 Claims, 2 Drawing Sheets

PROCESS OF PRODUCING ELECTRICAL TERMINAL WITH ELECTRICAL CONTACTS AND SYSTEM THEREOF

BACKGROUND OF THE INVENTION

1. Field of the Invention

The present invention relates to a process of producing an electrical terminal with an electrical contact at an end thereof, used as a switch terminal, a relay terminal or the like, more particularly to a process of continuously producing a large number of electrical contacts with electrical contacts, and a system therefor.

2. Description of the Related Art

To continuously produce a large number of electrical terminals with electrical contacts, provision has been made of a large number of contact mounting holes in a strip-like conductor. The strip-like conductor has been fed on a contact mounting and machining table. Contact members have been fitted into the contact mounting holes. The contact members have been successively inserted to fasten them to the strip-like conductor, and the strip-like conductor having the contact members mounted on it has been piece by piece separated into a plurality of pieces for each contact, so as to produce a large number of electrical terminals with contacts.

In the above-mentioned type of conventional production process, a large number of contact members must be successively inserted, as a result, production of a large number of electrical terminals with electrical contacts takes rather a long time. Further, it is necessary to replace the member for holding the contacts with each different type of contact, for example, a round contact, spherical contact, or wire contact material, and therefore the prior art suffers from the problem that a large number of different contacts could not be produced quickly.

SUMMARY OF THE INVENTION

An object of the present invention is to provide a process of producing electrical terminals with electrical contacts at a higher rate, a low cost, and even more accurately than ever.

Another object of the present invention is to provide a process of producing electrical terminals, which enables an easy production of various types of electrical contacts.

Still another object of the present invention is to provide a new system for producing the above electrical terminals.

According to the present invention, there is provided a process of producing electrical terminals with electrical contacts, including the steps of: a first step for continuously forming contact mounting holes at a first predetermined distance in a conductive base and conveying the electrical conductive base in a first direction: a second step for continuously forming contact holding holes at a second predetermined distance in a carrier, continuously fitting electrical contacts into the contact holding holes and conveying the carrier in a second direction perpendicular to the first direction; a third step for positioning the electrical contacts in the contact holding holes of the carrier to the contact mounting holes of the electrical conductive base; a fourth step for fitting the electrical contacts in the contact holding holes into the contact mounting holes of the electrical conductive base; and a fifth step for cutting the electrical conductive base to separate electrical terminals each having an electrical contact at an end thereof.

The first step includes a step for continuously forming first pilot holes at a third predetermined distance in the electrical conductive base. Also, the second step includes a step for forming second pilot holes at a fourth predetermined distance in the carrier. Further, the third step positions the second pilot holes to the first pilot holes to position the electrical contacts in the contact holding holes of the carrier to the contact mounting holes of the electrical conductive base.

Preferably, the fourth step presses the electrical contacts in the contact holding holes of the carrier on the contact mounting holes of the electrical conductive base to fit the electrical contacts into the contact mounting holes and fix them therein.

The process of producing electrical terminals with electrical contacts, further includes a sixth step for confirming whether or not electrical contacts are fitted into the contact holding holes of the carrier, before carrying out the third step.

According to the present invention, there is also provided a system for producing the above electrical terminals, using the above process.

BRIEF DESCRIPTION OF THE DRAWINGS

The above objects and features and other objects and features will be described in more detail with reference to the accompanying drawings, in which.

DESCRIPTION OF PREFERRED EMBODIMENTS

Figure 1:
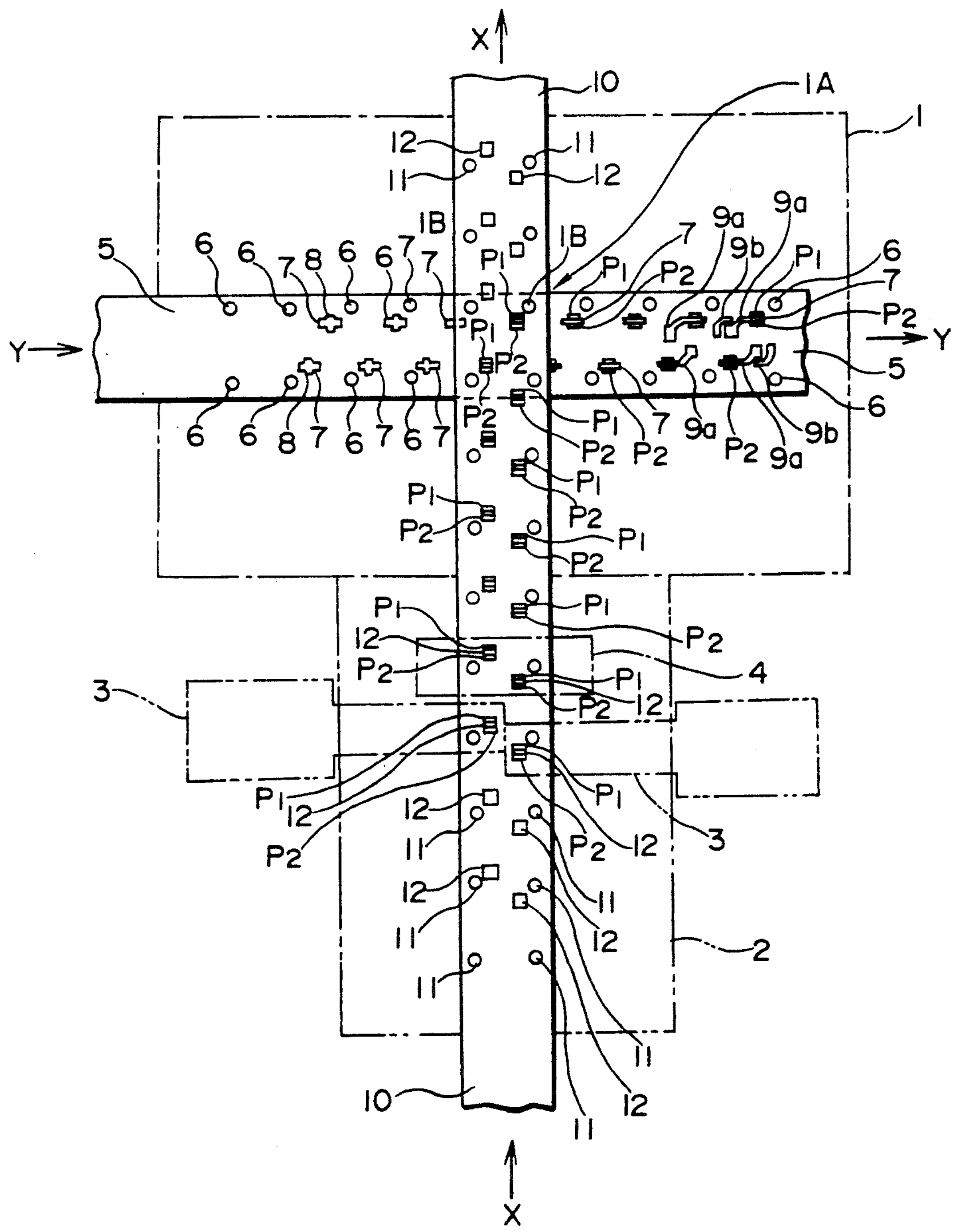
FIG. 1 is a view showing an embodiment of the present invention.
Figure 2:
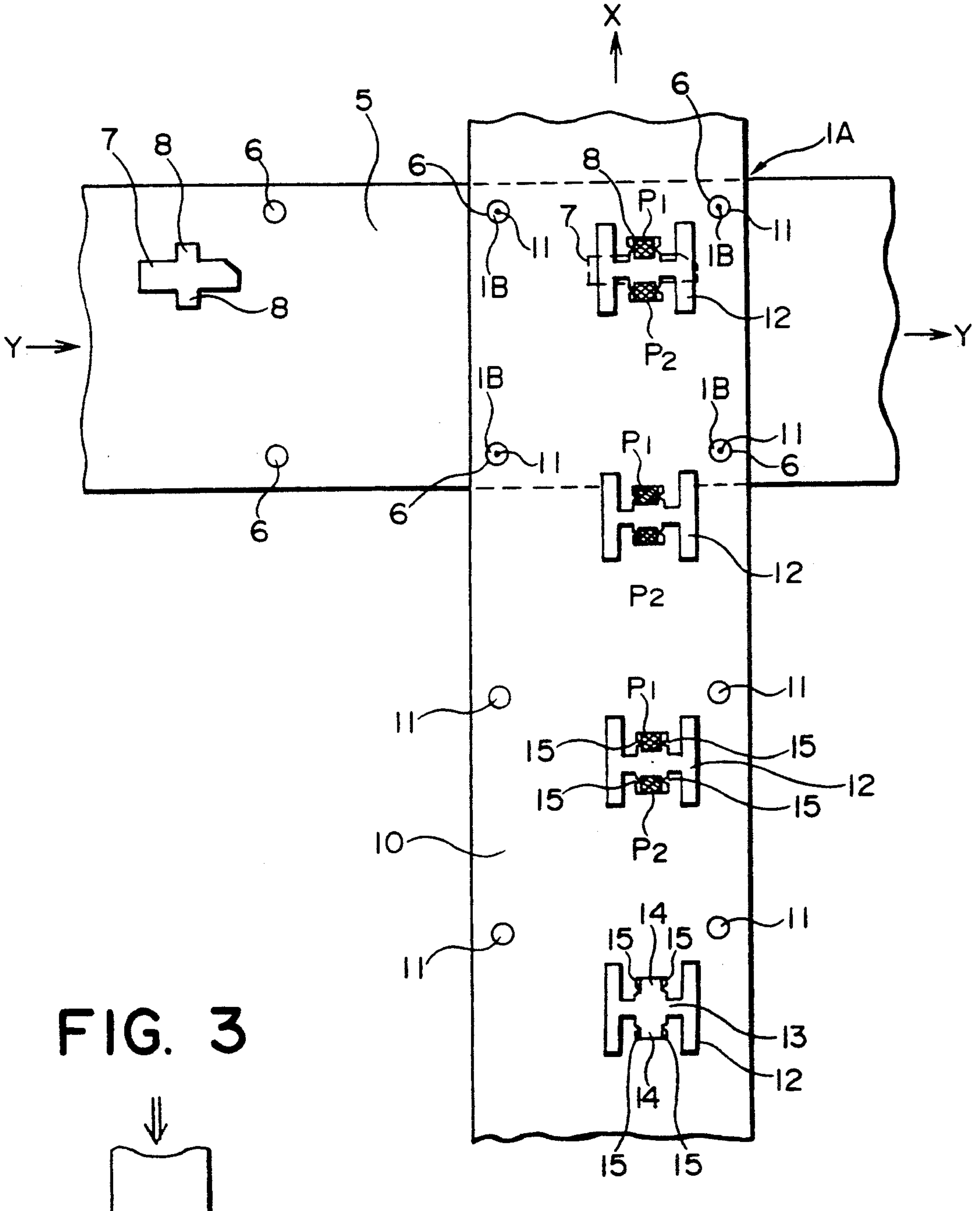
FIG. 2 is an enlarged view of key portions of a conductor base and a carrier.
Figure 3:
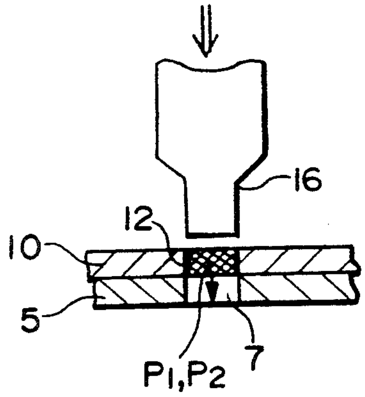
FIG. 3 is an explanatory view of the operation of an inserting tool.

An explanation will be given for embodiments of the present invention with reference to the drawings. FIG. 1, FIG. 2, and FIG. 3 show portions of the production of the electrical terminals with electrical contacts by the process of the present invention.

Reference numeral 1 indicates a main die table, on which table moves a strip-like conductor base 5 in which first pilot holes 6 and contact mounting holes 7 have been punched out. Further, the table serves to position a strip-like carrier 10 to the strip-like conductor base 5, insert the contacts to swage them into the strip-like conductor base 5, and punching out the terminals *9a* and *9b* with electrical contacts. Reference numeral 1A indicates a contact inserting table at the center of the die table.

Reference numeral 2 indicates a sub die table which is disposed at one side of the main die table 1. Second pilot holes 11 and temporary contact holding holes 12 are punched out in the strip-like carrier 10 moving on the table, and contacts are fed to the temporary contact holding holes 12 and temporarily held there.

Reference numerals 3, 3 indicate contact feeders disposed at the two sides of the sub die table 2. A large number of contacts are successively fed to the strip-like carrier 10 so as to temporarily hold the contacts in the strip-like carrier 10 moving on the sub die table 2. Reference numeral 4 indicates a contact detector which confirms if a contact being fed to the strip-like carrier 10 is temporarily held in a correct position or not.

The strip-like conductor base 5 comprises an elongated strip-like conductor sheet which moves on the main die table 1 in the Y arrow direction continuously due to a suitable feeding drive unit.

Reference numerals 6, 6 indicate circular pilot holes formed continuously at a predetermined interval at two side edges of the strip-like conductor base 5.

Reference numerals 7, 7 indicate contact mounting holes which are continuously punched out in the strip-like conductor base 5 at a predetermined interval.

The contact mounting holes 7, as shown in FIG. 2, are formed to be elongated cross shapes and have made the contact inserting holes 8, 8.

References 9*a*, 9*b* indicate terminal pieces with electrical contacts which are punched to be predetermined shapes, forming terminals with contacts, the strip-like conductor base 5 portions where the contacts are mounted on the contact mounting holes 7.

The strip-like carrier 10 comprises of an elongated strip-like metal which continuously moves on the sub die table 2 in the X arrow direction due to a suitable feeding drive unit and moves on the top surface of the strip-like conductor base 5 on the main die table 1.

Reference numerals 11, 11 denote circular pilot holes formed continuously at a set interval at the two side edges of the strip-like carrier 10.

Reference numerals 12, 12 denote temporary contact holding holes provided for positioning and temporarily holding the contacts continuously fed from the contact feeders 3, 3 and obtained by continuously punching the strip-like carrier 10 at predetermined intervals. The temporary contact holding holes 12, as shown in FIG. 2, are formed by providing two contact fitting hole portions 14, 14 communicating with the two side edges of a center hole portion 13 of a hole punched to an H-shape and making contact holding projections 15, 15 project out opposing each other from the two opposing side edges of the contact fitting hole portions 14, 14.

Symbols P1 and P2 denote two contacts, which are fed to the temporary contact holding holes 12, 12 of the said strip-like carrier 10 in the following way and are temporarily held there, then are inserted to be fastened to the contact mounting holes 7 of the strip-like conductor base 5.

In accordance with the process of the present invention, an electrical terminal with an electrical contact by the above portions is produced by the following steps.

The strip-like conductor base 5 is continuously fed and moved on the main die table 1 in the Y arrow direction of FIG. 1. On the strip-like conductor base 5, first at the two side edges, are provided pilot holes 6, 6 by punching.

Next, at the latter stage of the hole punching, the contact mounting holes 7, 7 are provided in the strip-like conductor base 5 by punching.

The strip-like conductor base portions in which the pilot holes 6 and the contact mounting holes 7 have been formed are fed on the contact inserting table portion 1A of the center of the main die table.

The strip-like conductor base portions fed on the contact inserting table portion 1A are fit into their pilot holes 6 onto the positioning projections 1B (shown in FIG. 2) projecting on the contact calking table portion 1A.

In parallel with the hole punching of the strip-like conductor base 5, the strip-like carrier 10 is continuously moved on the sub die table 2 in the X arrow direction of FIG. 1. On the sub die table 2, pilot holes 11, 11 are provided at the two side edges of the strip-like carrier by punching.

Next, at the latter stage of the holding punching, temporary contact holding holes 12 are provided in the strip-like carrier 10 by punching.

Next, the contacts P1 and P2 are successively and continuously fed from the contact feeders 3, 3 to the temporary contact holding holes 12, 12 of the strip-like carrier 10. As shown in FIG. 2, the contacts P1 and P2 are engaged in and pressed to fit in between the opposing contact holding projections 15, 15 of the contact fitting hole portions 14, 14 of the temporary contact holding holes 12. The two sides of the contacts are held sandwiched by the tips of the two opposing contact holding projections 15, 15, whereby the contacts P1 and P2 are temporarily held in the temporary contact holding holes 12, 12.

Next, it is confirmed whether or not the contacts P1 and P2 are temporarily held by the temporary contact holding holes 12 of the strip-like carrier 10 by means of a contact presence detector 4 (shown in FIG. 1).

Next, the strip-like carrier portion where the pilot holes 11 and the temporary contact holding holes 12 are formed by punching and which passes through the contact presence detector 4 is fed onto the top surface of the strip-like conductor base 5 fed on the contact inserting table portion 1A of the center of the main die table 1.

At the contact calking table portion 1A, the portion of the strip-like carrier 10, where the temporary contact holding holes 12, 12 temporarily holding the contacts P1 and P2 are provided, is placed to perpendicularly intersect the top of the strip-like conductor base 5, and the pilot holes 11 of the strip-like carrier 10 are made to fit over the tips of the positioning projections 1B projecting upward and already engaged with the pilot holes 6 of the strip-like conductor base 5. The pilot holes 6, the pilot holes 11, and the positioning projections 1B shown in FIG. 2 show this state.

By fitting the pilot holes 6 of the strip-like conductor base 5 and the pilot holes 11 of the strip-like carrier 10 over the positioning projections 1B at the calking table portion 1A in this way, the contacts P1 and P2 temporarily held at the temporary contact holding holes 12 of the strip-like carrier 10 are precisely positioned, matched, and superimposed over predetermined positions of the contact mounting holes 7 of the strip-like conductor base 5.

Next, the contacts P1 and P2 temporarily held in the temporary contact holding holes 12 of the strip-like carrier 10 are swaged into the contact mounting holes 7 of the strip-like conductor base 5 by using an inserting tool 16 like the inserting punch shown in FIG. 3 to punch the contacts downward and remove them from the temporary contact holding holes 12 and to fit and fix the contacts P1 and P2 into the contact mounting holes 7 of the strip-like conductor base 5 under the strip-like carrier 10.

Next, at the inserting table portion 1A, the pilot holes 6 of the strip-like conductor base portions where the contacts P1 and P2 are mounted and the pilot holes 11 of the strip-like carrier portions where the contacts have been removed from the temporary contact holding holes 12 are detached from the positioning projections 1B in which they were fit, the strip-like conductor base portion is moved further in the Y direction passing through the inserting table portion 1A, and the strip-like carrier portion is moved in the X direction passing through the inserting table portion 1A and is wound up by a suitable winding apparatus etc.

Next, the strip-like conductor base portion which has the contacts P1 and P2 mounted on the contact mounting holes 7, 7 and has moved in the Y direction passing the inserting table portion 1A is punched out for making a predetermined shape and separated so as to form the shape of a terminal piece with electrical contacts.

In the above mentioned way, a terminal with electrical contacts, comprised of the terminal pieces 9*a* and 9*b* mounting the contacts P1 and P2, is produced.

According to the present invention, electrical contacts are produced by the above steps, but the contacts P1 and P2 can be made with various contact pieces such as for square contacts, round contacts, spherical contacts, and wire contacts. The temporary contact holding holes 12 of the strip-like carrier 10 and the contact mounting holes 7 of the strip-like conductor base 5 can be suitably shaped in accordance with the same.

In the above embodiments, two contacts P1 and P2 were mounted, but the number of contacts may be three or even one. Further, the contact feeder 3 which feeds the contacts to the temporary contact holding holes 12 of the strip-like carrier 10 may be made a part feeder or use may be made of contacts formed by cutting a wire contact.

As explained above, the present invention uses a strip-like carrier temporarily holding contacts to insert and swage the contacts into contact mounting holes of a strip-like conductor base, as a result, the contacts can be continuously fixed to a contact piece base correctly and at a higher rate, and accordingly, a variety of terminal with electrical contacts can be easily manufactured and can be provided at a low cost.

In the present invention, the conductor base 5 and the carrier 10 are not limited to be formed strip shapes, and thus, these can be formed a variety of long continuous shapes.

Many widely different embodiments of the present invention may be constructed without departing from the spirit and scope of the present invention, and it should be understood that the present invention is not restricted to the specific embodiments described above.

We claim:

1. A process of producing electrical terminals with electrical contacts, comprising the steps of:

- a first step for continuously forming contact mounting holes at a first predetermined distance in an electrical conductive base and conveying said electrical conductive base in a first direction;
- a second step for continuously forming contact holding holes at a second predetermined distance in a carrier, continuously fitting electrical contacts into said contact holding holes and conveying said carrier in a second direction perpendicular to said first direction;
- a third step for positioning said electrical contacts in said contact holding holes of said carrier to said contact mounting holes of said electrical conductive base;
- a fourth step for fitting said electrical contacts in said contact holding holes into said contact mounting holes of said electrical conductive base; and
- a fifth step for cutting said electrical conductive base to separate electrical terminal each having an electrical contact at an end thereof.

2. A process of producing electrical terminals with electrical contacts according to claim 1, wherein the first step includes a step for continuously providing first pilot holes at a third predetermined distance in said electrical conductive base,

- wherein the second step includes a step for forming second pilot holes at a fourth predetermined distance in said strip-like carrier, and
- wherein the third step positions said second pilot holes to said first pilot holes to position said electrical contacts in said contact holding holes of said carrier to said contact mounting holes of said electrical conductive base.

3. A process of producing electrical terminals with electrical contacts according to claim 2, wherein the fourth step presses said electrical contacts in said contact holding holes of said carrier on said contact mounting holes of said electrical conductive base to fit said electrical contacts into said contact mounting holes and fix them therein.

4. A process of producing electrical terminals with electrical contacts according to claim 3, further comprising a sixth step for confirming whether or not electrical contacts are fitted into said contact holding holes of said carrier, before carrying out the third step.

5. A system for producing electrical terminals with electrical contacts, comprising:

- a first means for continuously forming contact mounting holes at a first predetermined distance in an electrical conductive base and conveying said electrical conductive base in a first direction;
- a second means for continuously forming contact holding holes at a second predetermined distance in a carrier, continuously fitting electrical contacts into said contact holding holes and conveying said carrier in a second direction perpendicular to said first direction;
- a third means for positioning said electrical contacts in said contact holding holes of said carrier to said contact mounting holes of said electrical conductive base;
- a fourth means for fitting said electrical contacts in said contact holding holes into said contact mounting holes of said electrical conductive base; and
- a fifth means for cutting said electrical conductive base to separate electrical terminal each having an electrical contact at an end thereof.

6. A system for producing electrical terminals with electrical contacts according to claim 5, wherein the first means includes a means for continuously forming first pilot holes at a third predetermined distance in said electrical conductive base.

- wherein the second means includes a means for forming second pilot holes at a fourth predetermined distance in said carrier, and
- wherein the third means positions said second pilot holes to said first pilot holes to position said electrical contacts in said contact holding holes of said carrier to said contact mounting holes of said electrical conductive base.

7. A system for producing electrical terminals with electrical contacts according to claim 6, wherein the fourth means presses said electrical contacts in said contact holding holes of said carrier on said contact mounting holes of said electrical conductive base to fit said electrical contacts into said contact mounting holes and fix them therein.

8. A system for producing electrical terminals with electrical contacts according to claim 7, further comprising a sixth means for confirming whether or not electrical contacts are fitted into said contact holding holes of said carrier, before carrying out the third step.

* * * * *